United States Patent
Chan et al.

(10) Patent No.: US 11,003,672 B2
(45) Date of Patent: May 11, 2021

(54) RE-RANKING SEARCH RESULTS USING BLENDED LEARNING MODELS

(71) Applicant: Apple Inc., Cupertino, CA (US)

(72) Inventors: Hon Yuk Chan, Santa Clara, CA (US); John M. Hörnkvist, Cupertino, CA (US); Lun Cui, Fremont, CA (US); Vipul Ved Prakash, San Francisco, CA (US); Anubhav Malhotra, San Francisco, CA (US); Stanley N. Hung, Cupertino, CA (US); Julien Freudiger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 683 days.

(21) Appl. No.: 15/648,364

(22) Filed: Jul. 12, 2017

(65) Prior Publication Data
US 2018/0121435 A1    May 3, 2018

Related U.S. Application Data

(60) Provisional application No. 62/414,638, filed on Oct. 28, 2016.

(51) Int. Cl.
*G06F 16/2457* (2019.01)
*G06N 20/00* (2019.01)
(Continued)

(52) U.S. Cl.
CPC ...... *G06F 16/24578* (2019.01); *G06F 16/248* (2019.01); *G06F 16/335* (2019.01);
(Continued)

(58) Field of Classification Search
CPC .................. G06F 16/24578; G06F 16/335
See application file for complete search history.

(56) References Cited

U.S. PATENT DOCUMENTS

| 2011/0087673 A1 | 4/2011 | Chen et al. |
| 2012/0158685 A1 | 6/2012 | White et al. |

(Continued)

OTHER PUBLICATIONS

PCT International Search Report and Written Opinion of the International Searching Authority for PCT/US2017/057261 dated Jan. 29, 2018.
(Continued)

*Primary Examiner* — Grace Park
(74) *Attorney, Agent, or Firm* — Womble Bond Dickinson (US) LLP

(57) ABSTRACT

A method and apparatus of a device that re-rank a plurality of search results is described. In an exemplary embodiment, the device receives a search query from a user and generates the plurality of search results over a plurality of search domains, wherein the plurality of search results is ranked according to a first ranking. The device additionally generates a re-ranking model, where the re-ranking model includes a plurality of intra-domain models that are generated based on at least based on-device interactions of a plurality of users interacting with a plurality of other devices and each of the plurality of search domains corresponds to one of the plurality of intra-domain models. The device further re-ranks the plurality of search results using the re-ranking model and presents the plurality of search results using the second ranking.

18 Claims, 14 Drawing Sheets

(51) Int. Cl.
  *G06F 16/248* (2019.01)
  *G06F 16/951* (2019.01)
  *G06F 16/335* (2019.01)
  *G06F 16/9535* (2019.01)
  *G06N 3/04* (2006.01)
  *G06N 20/20* (2019.01)
  *G06N 3/08* (2006.01)

(52) U.S. Cl.
  CPC ........ *G06F 16/951* (2019.01); *G06F 16/9535* (2019.01); *G06N 3/0454* (2013.01); *G06N 3/08* (2013.01); *G06N 20/00* (2019.01); *G06N 20/20* (2019.01)

(56) References Cited

U.S. PATENT DOCUMENTS

| | | |
|---|---|---|
| 2013/0097146 A1 | 4/2013 | Lanphear et al. |
| 2014/0344017 A1* | 11/2014 | Deephanphongs ......................... G06Q 30/0201 705/7.29 |
| 2014/0358909 A1* | 12/2014 | Kolba, Jr. ............. G06F 16/951 707/723 |
| 2015/0347543 A1 | 12/2015 | Sinha et al. |
| 2015/0347594 A1 | 12/2015 | Hornkvist et al. |
| 2016/0357357 A1* | 12/2016 | Lemay .................. G06F 3/0481 |

OTHER PUBLICATIONS

PCT International Preliminary Report on Patentability for PCT/US2017/057261, dated May 9, 2019, 7 pages.

\* cited by examiner

RE-RANKING SEARCH RESULTS USING BLENDED LEARNING MODELS

RELATED APPLICATIONS

Applicant claims the benefit of priority of prior, provisional application Ser. No. 62/414,638, filed Oct. 28, 2016, the entirety of which is incorporated by reference.

FIELD OF INVENTION

This invention relates generally to search technology and more particularly to re-ranking search results using a blended learning model on a client.

BACKGROUND OF THE INVENTION

A user will often perform a query search to lookup information on the Web or from some other data sources. A query search begins with a client receiving the query string, which is sent to a search server. The search server receives query string and searches a search index for results that match this query string. The search server then returns the results to the client. In addition, the client can search local data using this query string as well. Each of the results will include a ranking score that is used to rank and present the search results. The search results with a higher ranking are presented higher than results with a lower ranking.

A challenge with these results is how to present the results. For example, the search results can have a raw ranking, but this ranking may not reflect a user's preference. In this example, after the client receives and presents the results, the user may engage with some of the results (e.g., click on a link for one of the results and spend time interacting with the website referenced by that link) and may also abandon some of these results. These engagement results can give an indication of the types of search results a user prefers or does not prefer. Furthermore, there are other types of data that can be used to determine which results a user prefers, but this type of data is usually private to the device.

SUMMARY OF THE DESCRIPTION

A method and apparatus of a device that generates a re-ranking model used to re-rank a plurality of search results on a client device is described. In an exemplary embodiment, the device receives a crowd-sourced intra-domain model from a server, where the intra-domain model is a search result re-ranking model generated based on at least device interactions of a plurality of users interacting with a plurality of other devices. The device further generates a re-ranking model from the crowd-sourced intra-domain model and a local model, where the local model includes private data representing a device user's interaction with that device and the re-ranking model is used to re-rank a plurality of search results.

In one embodiment, a machine-readable medium having executable instructions to cause one or more processing units to perform a method to generate a re-ranking model used to re-rank a plurality of search results on a client device. In this embodiment, the method receives a crowd-sourced intra-domain model from a server, where the intra-domain model is a search result re-ranking model generated based on at least device interactions of a plurality of users interacting with a plurality of other devices. In addition, the method generates a re-ranking model from the crowd-sourced intra-domain model and a local model, where the local model includes private data representing a device user's interaction with that device and the re-ranking model is used to re-rank a plurality of search results.

In one embodiment, the machine-readable medium method receives a crowd-sourced inter-domain model from the server, wherein the crowd-sourced inter-domain model indicates which of the plurality of search domains are to be ranked higher than others in the plurality of search domains. Furthermore, the machine-readable medium method generates the re-ranking model from the crowd-sourced inter-domain model and the local model and the crowd-sourced inter-domain model is used to blend the plurality of search results from the plurality of search domains. Furthermore, the machine-readable medium method sends a set of raw features to the server, wherein the set of raw features includes a characteristic of an interaction with the client device by a user of that client device. In addition, the set of raw features does not reveal private data about the client device user.

In one embodiment, there are a plurality of intra-domain models corresponding to a plurality of search domains that are used to generate the plurality of search results. In addition, a choice of the crowd-source intra-domain model is based on at least a local associated with the client device. Furthermore, the re-ranking model is a neural network model and the neural network model is trained based on at least the set of raw features.

In a further embodiment, a method re-ranks a plurality of search results by receiving, by a client device, a search query from a user. The method further generates, on the client device, the plurality of search results over a plurality of search domains, where the plurality of search results is ranked according to a first ranking. In addition, the method generates a re-ranking model, wherein the re-ranking model includes a plurality of intra-domain models that are generated based on at least based on-device interactions of a plurality of users interacting with a plurality of other devices and each of the plurality of search domains corresponds to one of the plurality of intra-domain models. Furthermore, the method re-ranks the plurality of search results, by the client device, using the re-ranking model and presents the plurality of search results using the second ranking.

In one embodiment, there are a plurality of intra-domain models that correspond to a plurality of search domains used to generate the plurality of search results. The plurality of search domains includes a plurality of on-device and off-device search domains. Each of the plurality of on-device search domains is selected from the group consisting of text messages, emails, contacts, calendar, contacts, music, movies, photos, application states, and installed applications. Each of the plurality of off-device search domains is selected from the group consisting of maps search domain, media store search domain, online encyclopedia search domain, and sites search domain. In addition, the intra-domain model is further generated from private information of device user stored on the client device. Furthermore, the method re-ranks a domain subset of the plurality of results in one of the plurality of search domains using the corresponding intra-domain model.

In one embodiment, a machine-readable medium having executable instructions to cause one or more processing units to perform a method to re-rank a plurality of search results. In this embodiment, the method receives, by a client device, a search query from a user. The method further generates, on the client device, the plurality of search results over a plurality of search domains, wherein the plurality of search results is ranked according to a first ranking. In addition, the method generates a re-ranking model, where the re-ranking model includes a plurality of intra-domain models that are generated based on at least based on-device interactions of a plurality of users interacting with a plurality of other devices and each of the plurality of search domains corresponds to one of the plurality of intra-domain models. The method further re-ranks the plurality of search results, by the client device, using the re-ranking model. Furthermore, the method presents the plurality of search results using the second ranking.

In another embodiment, the plurality of search domains includes a plurality of on-device search domains. In addition, each of the plurality of on-device search domains is selected from the group consisting of text messages, emails, contacts, calendar, contacts, music, movies, photos, and installed applications. Furthermore, the intra-domain model is further generated from private information of device user stored on the client device. The machine-readable method additionally re-ranks a domain subset of the plurality of results in one of the plurality of search domains using the corresponding intra-domain model. The plurality of search domains can further include a plurality of off-device search domains and can be generated from the private information of device user stored on the client device. The method can additionally re-rank the plurality of search domains using the inter-domain model. In addition, the re-ranking model is a neural network model and can further include a policy model.

In a further embodiment, a machine-readable medium having executable instructions to cause one or more processing units to perform a method to generate a crowd-source model used to re-rank a plurality of search results on a client device. The method receives raw features from a plurality of devices, wherein the result features are data that indicates how users of the plurality of devices use these devices and the raw features do not reveal private data about the user. In addition, the method generates a crowd-sourced model from the raw features, wherein the crowd-sourced model includes a crowd-sourced intra-domain model used to re-rank search results of a search query for one of a plurality of search domains and a crowd-sourced inter-domain used to re-rank the plurality of search domains providing the search results of the search query. The method further discloses that the crowd-sourced model is sent to the client device in response to the client device requesting the crowd-sourced model.

In one embodiment, the client device request is an opt-in by the client device to receive the crowd-sourced model. This client opt-in request can be an opt-in request to allow diagnostic data collection.

In another embodiment, a method generates a crowd-source model used to re-rank a plurality of search results on a client device. The method receives raw features from a plurality of devices, wherein the result features are data that indicates how users of the plurality of devices use these devices and the raw features do not reveal private data about the user. In addition, the method generates a crowd-sourced model from the raw features, wherein the crowd-sourced model includes a crowd-sourced intra-domain model used to re-rank search results of a search query for one of a plurality of search domains and a crowd-sourced inter-domain used to re-rank the plurality of search domains providing the search results of the search query. The method further discloses that the crowd-sourced model is sent to the client device in response to the client device requesting the crowd-sourced model. In one embodiment, the client device request is an opt-in by the client device to receive the crowd-sourced model. This client opt-in request can be an opt-in request to allow diagnostic data collection.

In one embodiment, a device that re-ranks a plurality of search results. The device includes a processor and memory coupled to the processor though a bus. The device further includes a process, executed from the memory by the processor, that causes the processor to receive a search query from a user, and generate the plurality of search results over a plurality of search domains. The process further causes the processor to generate a re-ranking model, re-rank the plurality of search results, by the client device, using the re-ranking model, and presenting the plurality of search results using the second ranking. In addition, the plurality of search results is ranked according to a first ranking, wherein the re-ranking model includes a plurality of intra-domain models that are generated based on at least based on-device interactions of a plurality of users interacting with a plurality of other devices and each of the plurality of search domains corresponds to one of the plurality of intra-domain models Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
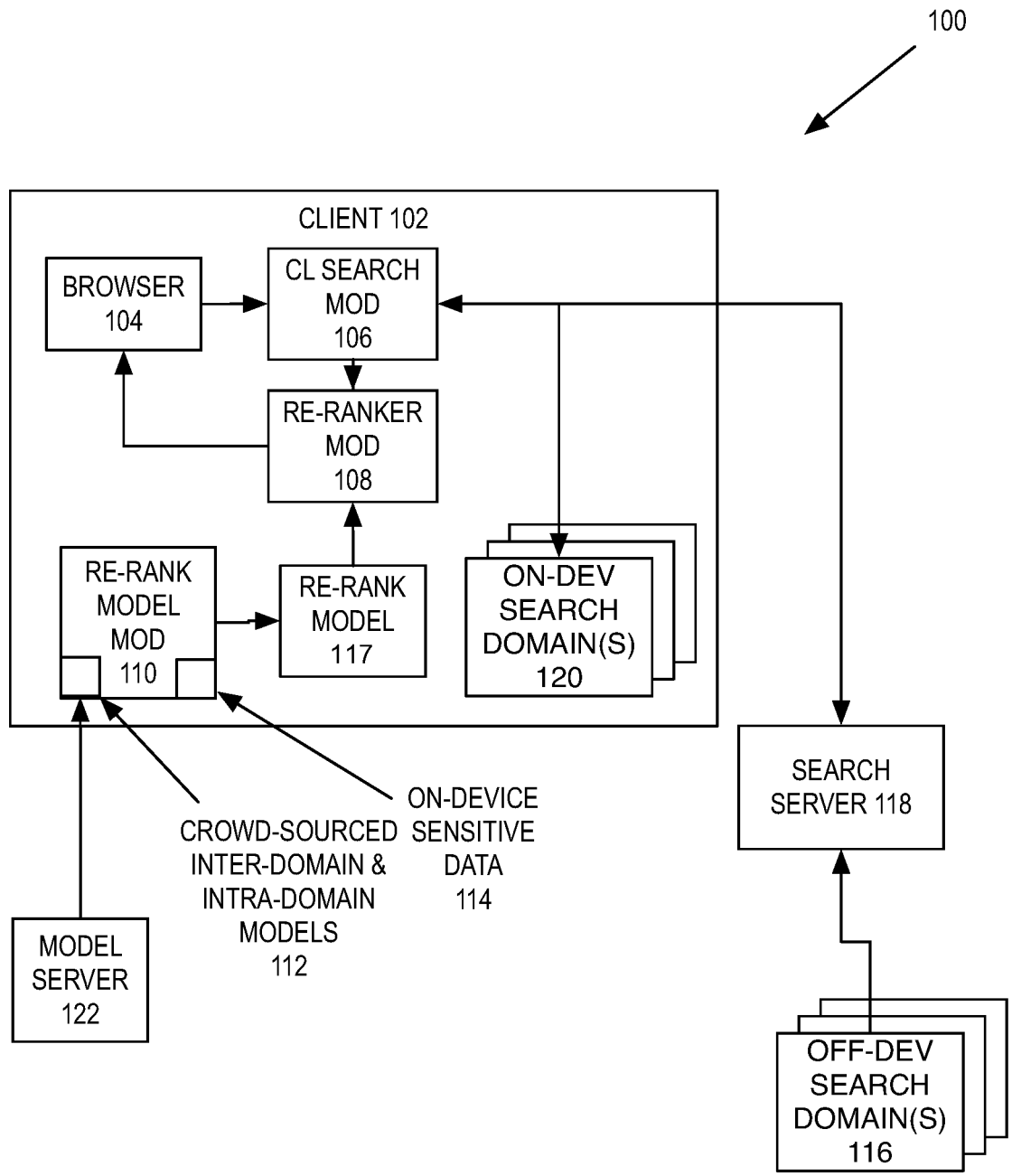
FIG. 1 is a block diagram of one embodiment of a system that returns search results, where the client re-ranks the search results.

A method and apparatus of a device that re-ranks a plurality of search results received from a search server on the device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that re-ranks a plurality of search results received from a search server on the device is described. In one embodiment, the device re-ranks search results received on the device using crowd-sourced models received from a model server. In this embodiment, the model server generates the crowd-sourced models from raw features periodically received from multiple devices. The raw features are data indicating a use of the device (e.g., types of results a user engages with, types of results a user abandons, application usage history, how a user interacts with installed applications on the device (e.g., contacts, calendar, email, music, and/or other installed applications)). In one embodiment, each of the raw features collected from the different devices is anonymized such that discovery of a raw feature for device will not lead to discovery of personal data stored on that device or which device contributed that raw feature.

With these raw features, the model server can generate two types of crowd-sourced domain models: an intra-domain model and an inter-domain model. In one embodiment, the intra-domain model can be used by the device to rank search results within a search domain. There can be more than one intra-domain models for the different on-device search domain supported by the device. For example and in one embodiment, there can be a separate intra-domain models for each of the on-device search domains or there can be one or more common intra-domain models for some or all of the on-device search domains. The inter-domain model can be used by the device to rank search domains. In this embodiment, each of the intra- and inter-domain models are machine-learning models (e.g., a neural network model). In one embodiment, the model server generates the crowd-sourced intra- and inter-domain models and sends these models to the device.

In one embodiment, the device receives these models. Instead of using these models as is to rank the results and/or domains, the device combines each of intra- and inter-domain models with on-device sensitive data to generate local (and personalized) intra- and inter-domain models. In one embodiment, the on-device sensitive data is private data collected about how the user uses the device but this data remains resident on the device and is not sent to a server for collection (e.g., not sent to the model server as part of the raw feature collection, not sent to a search server as part of a search request, and/or other types of data collection scenarios). For example and in one embodiment, the on-device sensitive data can include a user's browser history, application states that include private data, and/or other types of private data.

In this embodiment, the device uses the local intra-domain model to re-rank search results from on-device search domains (e.g., contacts, email, messages, calendar, application history, music, other media, and/or other types of on-device search domains). Furthermore, the device uses the local inter-domain model to rank the on-device search domains. In one embodiment, the device can use an inputted search query to search on-device search domain and/or off-device search domains (e.g., a search query sent to a search server). In this embodiment, the device receives the results for the on-device and/or off-device and re-ranks the on-device results using the local intra-domain and inter-domain models. The search server re-ranks the off-device search results using server-based intra-domain and inter-domain models, which do not include the personalization with the user's sensitive data. The device integrates the re-ranked on-device and off-device search results and applies one or more policies that can constrain the re-ranking, add further re-rankings, and/or affect the search result rankings in other ways.

FIG. 1 is a block diagram of one embodiment of a system 100 that returns search result, where the client re-ranks the search results. In FIG. 1, the system 100 includes a client 102, model server 122, and search server 118 coupled by a network (not illustrated). In one embodiment, the search server 118 is a collection of one or more servers that receives search requests from client 102 and/or other devices and returns search results back to those devices. In one embodiment, the client 102, model server 122, and/or search server 118 can be personal computer, laptop, server, mobile device (e.g., smartphone, laptop, personal digital assistant, music playing device, gaming device, etc.), and/or any device capable requesting a search and/or displaying search results. In one embodiment, the client 102, model server 122, and/or search server 118 can be a physical or virtual device. In one embodiment, the smartphone can be a cellular telephone that is able to perform many functions of device 102.

In one embodiment, the client 102 includes a browser 104 that is used to input a query prefix by the user. For example in one embodiment, browser 104 can be a web browser and/or a file browser. Each of these browsers includes a search input field that is used by the user to input the search query. In one embodiment, a web browser is a program that allows a user to search the web and/or other search domains and retrieve for various types of objects. In an alternative embodiment, the browser can be another type of application that allows a user to input a search query, which is used to search on-device and/or off-device search domains. In one embodiment, the browser includes a search input field, where the search input field is used by the user to input a search request string. In this embodiment, the client 102 sends this search request string to the search server 118. In one embodiment, the search server 118 performs the search over one or more search domains 116. In one embodiment, the search server 118 performs a search for relevant results across multiple search off-device domains (e.g., maps, media, wiki, sites, other, or another search domain). The device receives a set of results from the multiple off-device search domains and ranks these results based on scores generated from each search domain and cross-domain information. In addition, the search server 118 determines the search results from these search domains and sends these search results back to the client.

As described above, the client 102 can re-rank search results. In one embodiment, the browser 104 receives a search request and sends it to the client search module 106. The client search module 106 sends the search request to the search server 118, where the search server 118 performs a search over one or more search domains 116. The search server 118 determines and scores each of the search results, where the individual search results score is used to rank the search results. In one embodiment, the search server 118 sends back the search results, which includes the search results scores. The client search module 106 receives the search results and forwards these search results to the client re-ranker module 108.

In addition, and in one embodiment, the client 102 can use the search query to search on-device search domains 120 that are hosted on the client 102. In this embodiment, the client 102 searches the on-device search domains 120 match to the search query. In one embodiment, the on-device search domains are different domains of data that can be searched and are stored on the device (e.g., messages, email, contacts, calendar, music, movies, other media, installed applications (e.g., application states for these installed applications), and/or other types of on-device search domains. From these on-device search domains 120, the client can receive a set of on-device search results and/or a set of off-device search results from the search server 118. With these sets of search results, the client 102 can re-rank these sets of search results using a re-ranking model 117. In one embodiment, the re-ranking model 117 includes an on-device model for intra-domain re-ranking results within a search domain, and on-device model for inter-domain re-ranking of search domains and/or a policy model that is a set of rules to enforce business and/or user interface decisions. In one embodiment, the intra-domain and inter-domain models are generated from crowd-sourced models 112 and on-device sensitive data 114.

In one embodiment, a model server 122 receives raw features from various devices and generates a crowd-sourced intra-domain model and/or a crowd source inter-domain model from these raw features. In this embodiment, the raw features are data indicating a use of the device (e.g., types of results a user engages with, types of results a user abandons, application usage history, how a user interacts with installed applications on the device (e.g., contacts, calendar, email, music, and/or other installed applications)). Furthermore, the raw feature can include, length of field in result, query features (e.g., number of query terms and/or other types of query features), query-result features (e.g., cosine similarity and/or other types of query features), user-result features (e.g., whether user has engage the result, abandoned the result, distance of user from result (e.g., result is representation of an object in the world), user feature (e.g., device type of result, time of day when query run, and/or another type of user result), and/or other types of features of the query, result, user, and/or device used. In one embodiment, each of the raw features collected from the different devices is anonymized such that discovery of a raw feature for device will not lead to discovery of personal data stored on that device or which device contributed that raw feature. The raw features can be collected periodically, such as daily, weekly, or another time period. Alternatively, the raw features can be collected in a dynamic fashion, e.g., as the raw features are generated. In one embodiment, the raw features are collected if the user opts in to having this data collected, such as an opt in for a collection of diagnostic data. Furthermore, selective subsets of the raw features are collected, instead of having all of the possible raw features collected at every instance. For example and in one embodiment, the raw features could be collected at one time as a selected set of results from an engaged result set and the raw features collected at a different time could be a set of abandoned results. Other types of information collected for the raw features can be how a user interacts with applications installed on the device. In this example, data could be collected on the frequency of times a user interacted with the contacts or mail application. In this example the data collected is anonymized such that the private data of the user of this device is not accidentally discovered.

In contrast, and in one embodiment, the on-device sensitive data is private data collected about how the user uses the device but this data remains resident on the device and is not sent to a server for collection (e.g., not sent to the model server as part of the raw feature collection, not sent to a search server as part of a search request, and/or other types of data collection scenarios). For example and in one embodiment, the on-device sensitive data can include a users browser history, application states that include private data, and/or other types of private data. The re-rank model module 110 generates the local intra-domain model and inter-domain model from the on-device sensitive data with the crowd-sourced intra-domain model and crowd-sourced inter domain model, respectively. For example and in one embodiment, the re-rank model module 110 generates the intra-domain model from the crowd-sourced intra-domain model and the on-device sensitive data. Furthermore, the re-rank model module 110 generates the inter-domain model from the crowd-sourced inter-domain model and the on-device sensitive data. The re-ranker module 108 uses the intra-domain and inter-domain models to re-rank the search results from the on-device search domains 120 and/or off-device search domains 116. The re-rank model 117 can further include a policy model that includes a set of policy rules to re-rank these results. In one embodiment, the client 102 receives the crowd-sourced intra-domain model and inter-domain model if the client 102 opts-in to receive these models. In this embodiment, the client 102 can opt-in by agreeing to allow collection of diagnostic data or some other way of opting in.

Figure 2:
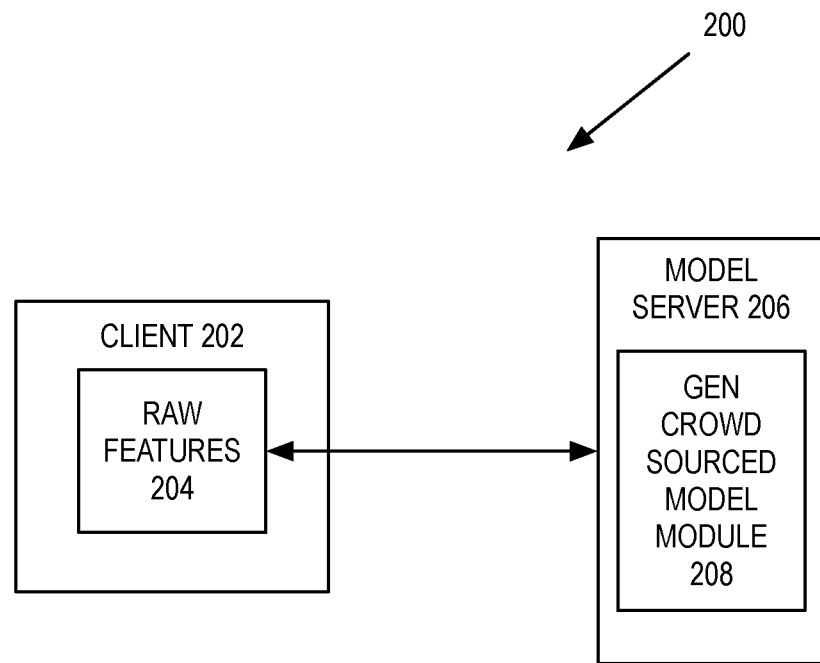
FIG. 2 is a block diagram of one embodiment of a system that receives raw features of a client and uses the raw features to generate crowd-sourced models.

FIG. 2 is a block diagram of one embodiment of a system 200 that receives raw features of a client and uses the raw features to generate crowd-sourced models. In FIG. 2, the client 202 is coupled to a model server 206. In one embodiment, the client 202 and model server 206 are the client and model server as described above in FIG. 1. In one embodiment, the client 202 includes raw features 204. As described above in FIG. 1, the raw features are anonymized data that gives indications on how a user interacts with the client. In this embodiment, the raw features 204 can be collected on a periodic schedule or a dynamic schedule. The model server 206 includes a generate crowd-sourced model module 208 that collects the raw features from the client 102 and uses these raw features from this client and/or other devices to generate the crowd-sourced domain models. For example and in one embodiment, the generated crowd-sourced model module 208 can generate an intra-domain model from the collected raw features.

In one embodiment, the model server 206 collects the raw features 204 from the client and/or other devices into a set of collected features F. The model server 206 preprocesses the collected features set F into a new collected features set F'. In this embodiment, the model server preprocesses the collected features set transforming features, dropping features, create new features, normalizing features, and/or other feature preprocessing. The model server 206 uses F' as input to train the machine learning algorithm that is used to generate the crowd-sourced intra-domain model. In one embodiment, the machine-learning algorithm is a neural network. For example and in one embodiment, the model server 206 uses the F' feature set as the lower layer in the neural network, where there is a set of intermediate layers that is a compacted representation and a final layer of neural network neurons. In this example, the final layer can include two neurons representing a likely to be engaged and likely not to be engaged result. In another embodiments, there can be more or less number and types of results for the final layer of neurons for the crowd-sourced intra-domain model.

As another example and embodiment, the model server 206 uses F' as input for the crowd-sourced inter-domain model. In this example, the model server 206 uses the F' feature set is an input for the neural network, where there is a set of intermediate layers and a final layer neural network neurons. In this example, the final layer can include four neurons representing different values for domain results (e.g., bad result, fair result, good result, and excellent result). In another embodiments, there can be more or less number and types of results for the final layer of neurons for the crowd-sourced inter-domain model.

In one embodiment, there can be several different crowd-sourced intra-domain models used by the client. For example and in one embodiment, there can be a crowd-sourced intra-domain model for each of the on-device supported search domains. Alternatively, there can be a common crowd-sourced intra-domain model for some search domains and different crowd-sourced intra-domain models for other search domains. Furthermore, there could be a common crowd-sourced intra-domain model for all of the supported search domains. In one embodiment, there can be a common crowd-sourced inter domain model for the supported search domains. Alternatively, there can be more than one crowd-sourced inter-domain model for the supported search domains.

In one embodiment, there can be different intra-domain and intra-domain models based on geography and locale. In one embodiment, with the generated inter-domain and/or intra-domain models, the model server 206 can send these models to the client 202.

In one embodiment, in addition to neural network models, there can be generated Gradient Boosting Decision Tree (GBDT) models for both L2 and L3. Specifically, the model server can use a pairwise training objective during training to minimize accuracy errors. In another embodiment, the model server 206 can generate both L2 and L3 only using data that users sent via the privacy friendly (anonymous and without sharing the actual query with us) diagnostic data channel, without using any data from the generic feedback which does contain the user query. In this mode, the model server 206 sends the server results metadata with local result metadata in the anonymous feedback.

In a further embodiment, and in addition to the model that is trained and generated using only organic data collected from users in anonymous feedback, the model server 206 can create artificial (fake) data to train and generate another model. The model generated has the ability to boost certain types of results higher than other results. For example and in one embodiment, an application or mail result that is more recently used or sent could get a higher ranker even though it does not have as well a match based on text features compared to other results. As another example and embodiment, a mail sent by certain people designated as VIP can be ranked higher than other emails with the same recency or text matching characteristics. The boosting also work in combination. For example, a mail sent by a VIP that is also more recent, will be ranked higher than a mail sent by a VIP but is less recent, assuming both have the same quality of match otherwise (text matching, etc.).

In a further embodiment, one way to employ the boosting model is to combine the score from the first model (the one trained using organic data) and the second model (trained using fake data) in a function that combines the scores in some way, to yield the final score for ranking the results.

Figure 3:
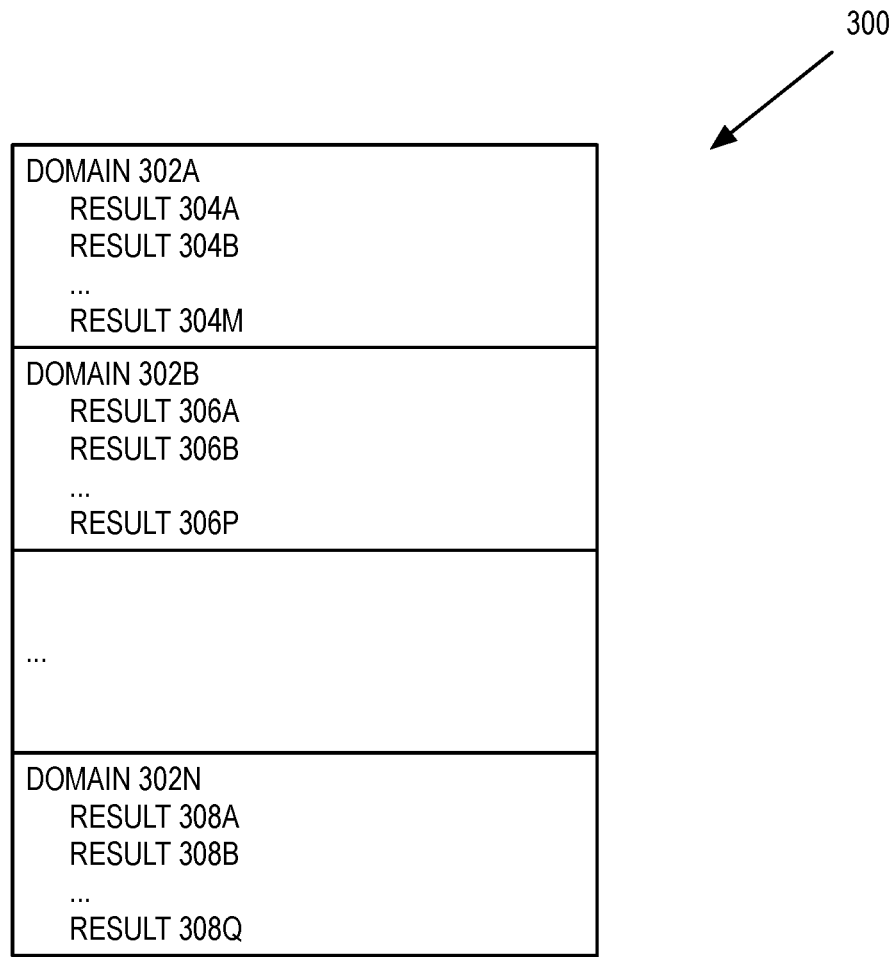
FIG. 3 is an illustration of one embodiment of a set of search results for a search query from multiple search domains.

FIG. 3 is an illustration of one embodiment of a set of search results 300 for a search query from multiple search domains. In FIG. 3, the set of search results 300 is grouped by search domains 302A-N. In one embodiment, the search domains 302A-N correspond one, some, or all of the on-device and/or off-device search domains as described in FIG. 1 above. Each of the search domains can include zero or more results. For example and in one embodiment, search domain 302A includes results 304A-M, search domain 302B includes results 304A-P, and search domain 302N includes results 308A-Q, where N, M, P, Q can be the same or different values.

In one embodiment, the client can use the intra-domain model to re-rank the rankings of results in one or more of the search domains 302A-N. For example and in one embodiment, the client can use the intra-domain model to re-rank the result 304B ahead of the result 304A. Furthermore, and in one embodiment, the client can use the inter-domain model to re-rank the search domains 302A-N. By using the inter-domain model, the client may rank search results from the contact search domain ahead of search results from the news search domain. Thus, using the inter-domain model, the client may rank domain 302B (and corresponding results 306A-P) ahead of domain 302A (and corresponding results 304A-M). Thus, the client can present the search results using these adjusted rankings (e.g., in a browser or another application that can perform a search).

Figure 4:
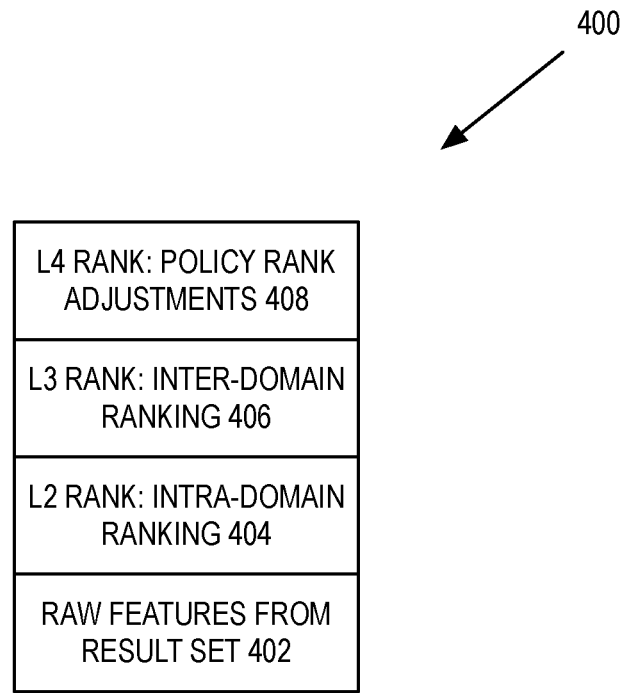
FIG. 4 is an illustration of one embodiment of a set of layers used to rank the set of search results.

FIG. 4 is an illustration of one embodiment of a set of layers 400 used to rank the set of search results. In FIG. 4, the set of layers 400 can be used to initially rank and re-rank search results from on-device and/or off-device search domains. In one embodiment, the first layer is the raw features derived from result set, the search query, and device or context used in submitting the search query. In this embodiment, the raw features can be features derived from the result set (e.g., result score, cosine similarity and/or other types of query features, user-result features (e.g., whether user has engage the result, abandoned the result, distance of user from result (e.g., result is representation of an object in the world), and/or other types of result set features). Alternatively, the raw features can be query features (e.g., number of query terms and/or other types of query features). In addition, the features can be derived from the device or context used in submitting the search query (e.g., how a user interacts with installed applications on the device (e.g., contacts, calendar, email, music, and/or other installed applications). In one embodiment, the layer above, L2 404, is a ranking of results using the client's and/or server's intra-domain models. In one embodiment, the L2 rank results from the client using the intra-domain model to re-rank the results for a particular domain as described above in FIG. 1.

In one embodiment, the L3 rank re-ranks domains using the inter-domain model.

A further ranking may be applied based on policy. In one embodiment, this is the L4 rank which uses policy to further adjust the ranking of the domains and/or individual results. In one embodiment, the L4 rank is a layer of policies to filter/threshold results based on the L3 score and/or can be used to regroup results based on user interface requirements. The L4 rank policies can be different for the server-side rank in the client-side rank. In one embodiment, the L4 rank policies can be constraints on reordering server results, constraints on inserting results between server results, and/or advisory on placement.

Figure 5:
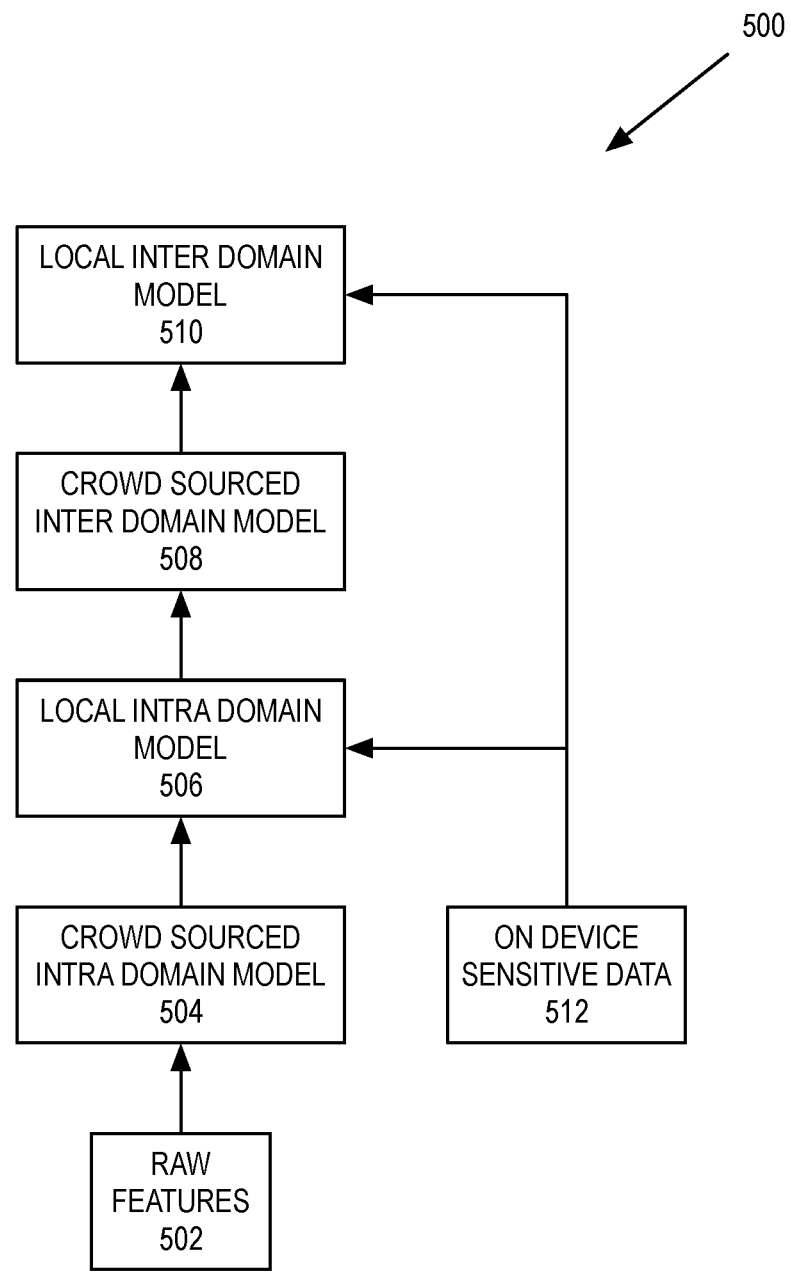
FIG. 5 is a block diagram of one embodiment of local domain model generated from crowd-sourced domain models and on-device sensitive data.

FIG. 5 is a block diagram of one embodiment of local domain models 500 generated from crowd-sourced domain models and on-device sensitive data. In FIG. 5, the system 500 includes raw features 502 from the client and/or other devices that are used to create the crowd-sourced intra-domain model 504. For example and in one embodiment, the client may have recently booted up and has not shared raw features, but this client still can receive the crowd-sourced domain model(s) from a model server. In another embodiment, the user of a client may not have opted in, but still can receive the crowd-sourced intra-domain model 504 in order to re-rank the search result. In one embodiment, the local intra-domain model 506 is generated from the crowd-sourced intra-domain model 504 and the on-device sensitive data 512. In one embodiment, the local intra-domain model 506 is a linear combination of the crowd-sourced intra-domain model 504 and the on-device sensitive data 512. For example and in one embodiment, $$\text{LIDM} = w_1 * \text{CSIDM} + w_2 * \text{SD} \quad (1)$$

where LIDM is the local intra-domain model 506, CSIDM is the crowd-sourced intra-domain model 504, SD is the on-device sensitive data 512, $w_1$, $w_2$ are the blending weights for the crowd-sourced intra-domain model 504 and on-device sensitive data 512, respectively.

In one embodiment, the crowd-sourced intra-domain model 504 and local intra-domain model 506 is a neural network model or some other type of machine learning model.

The client further, and in one embodiment, receives a crowd-sourced inter-domain model 508 that is generated from the collected raw features. The client generates a local inter-domain model 510 from the crowd-sourced inter-domain model 508 and the on-device sensitive data 512.

In one embodiment, the local inter-domain model 510 is a linear combination of the crowd-sourced inter-domain model 508 and the on-device sensitive data 512. For example and in one embodiment, $$\text{LInDM} = w_3 * \text{CSInDM} + w_4 * \text{SD} \quad (2)$$

where LInDM is the local inter-domain model 510, CSIDM is the crowd-sourced inter-domain model 504, SD is the on-device sensitive data 512, $w_3$, $w_4$ are the blending weights for the crowd-sourced inter-domain model 508 and on-device sensitive data 512, respectively.

Figure 6:
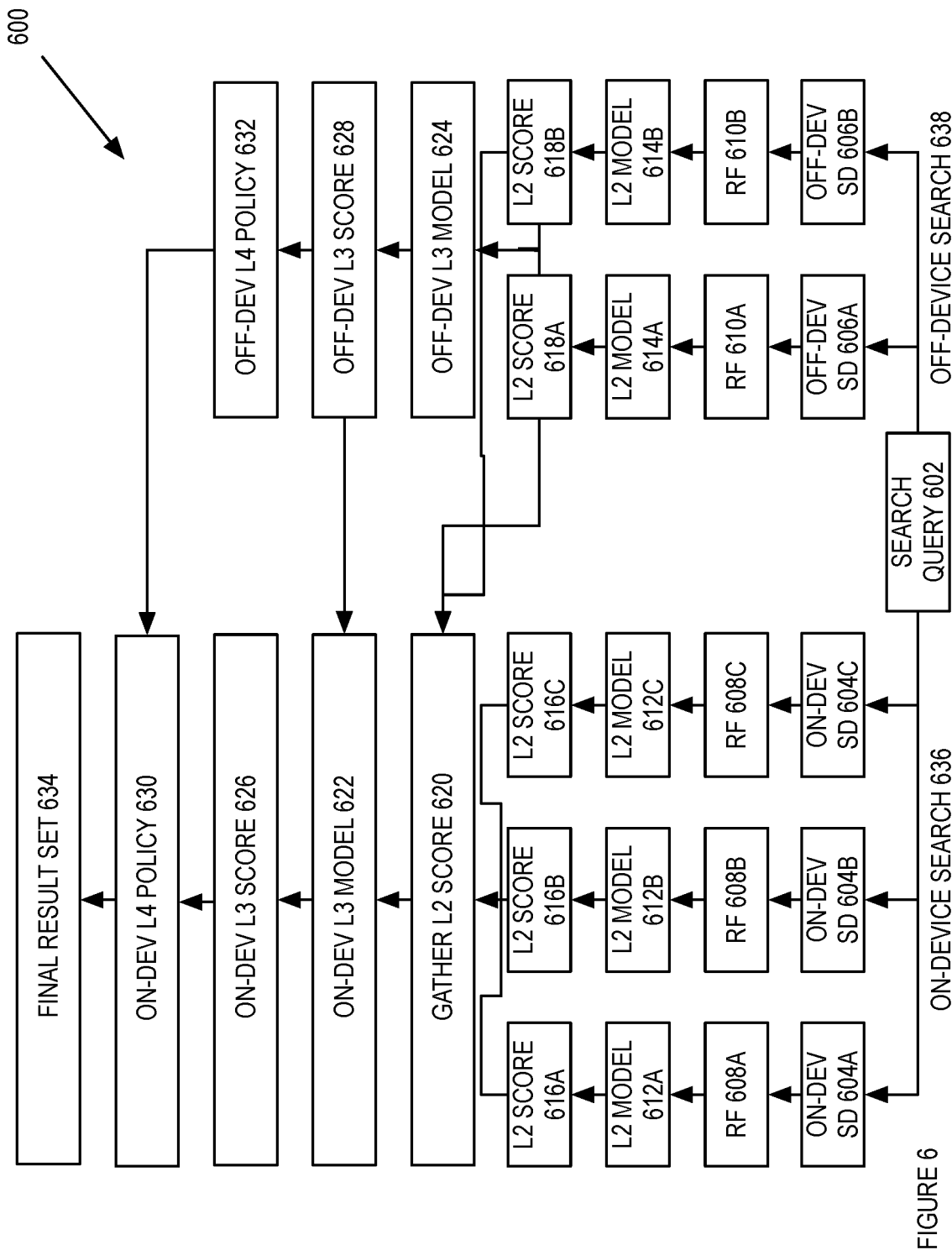
FIG. 6 is a block diagram of one embodiment of search system that re-ranks search results using intra- and inter-domain models.

FIG. 6 is a block diagram of one embodiment of search system 600 that re-ranks search results using intra- and inter-domain models. In FIG. 6, the system 600 processes a search query 602 using an on-device search 636 and off-device search 638. In one embodiment, the on-device search 636 is performed by the same device that received the search query 602 from the user. Furthermore, and in this embodiment, the off-device search 638 is performed by a search server, such as a search server 118 as described in FIG. 1 above.

In one embodiment, the on-device search 636 applies the search query multiple on-device search domains 604A-C. While in one embodiment, there are three on-device search domains 604A-C illustrated as being used for the on-device search 636, in alternate embodiments, there can be more or less on-device search domains used for the on-device search 636. In one embodiment, each of the on-device search domains 604A-C outputs a set of raw features 608A-C. In this embodiment, the raw features 608A-C are the raw features extracted from each of the results from the search domains 604A-C. Furthermore, the raw features 608A-C can include search server dependent features (e.g. popularity of result, crowd popularity, pointers to/from in the result, page rank, anchor text matching query, authority of domain for result). In addition, each of the on-device search domains 604A-C produces a set of search results for the search query 602 and that respective search domain 604A-C.

In addition, and in one embodiment, the on-device search 636 applies the L2 model 612A-C to each of the search results from the corresponding on-device search domain 604A-C. In one embodiment, the L2 model 612A-C is the intra-domain model generated from the crowd-sourced intra-domain model and on-device sensitive data corresponding to the on-device search domain 604A-C. For example and in one embodiment, the on-device search 636 uses the extracted raw features for each of the results in the results set and applies the corresponding L2 model 612A-C. By applying the L2 model 612A-C, the on-device search 636 generates an L2 score 616A-C for each of the search results of those on-device search domains 604A-C. In one embodiment, the L2 scores 616A-C for these search results is fed to the gatherer L2 score 620.

In one embodiment, if an off-device search 638 is performed, the off-device search 638 receives the search query 602 and applies this search query to the off-device search domains 606A-B. While in one embodiment, there are two off-device search domains 606A-B illustrated as being used for the off-device search 638, in alternate embodiments, there can be more or less off-device search domains used for the on-device search 638. In one embodiment, each of the off-device search domains 606A-B output a set of raw features 610A-B. In this embodiment, the raw features 610A-B are the raw features extracted from each of the results from the search domains 606A-C. Furthermore, the raw features 610A-C can include result independent features (e.g. user features as described above in FIG. 1). In addition, each of the off-device search domains 606A-B produces a set of search results for the search query 602 and that respective search domain 606A-B.

In addition, and in one embodiment, the off-device search 636 applies the L2 model 614A-B to each of the search results from the corresponding on-device search domain 604A-C. In one embodiment, the L2 model 614A-B is a server-based intra-domain model generated from the crowd-sourced intra-domain model corresponding to the on-device search domain 604A-C. For example and in one embodiment, the off-device search 638 uses the extracted raw features for each of the results in the results set and applies the corresponding L2 model 614A-B. By applying the L2 model 614A-C, the off-device search 636 generates an L2 score 618A-B for each of the search results of those on-device search domains 606A-B. In one embodiment, the L2 scores 61BA-B for these search results is fed to the gather L2 score 620.

In one embodiment, the L2 scores 618A-B are fed to the off-device L3 model 624. In this embodiment, the off-device L3 model 624 is a server-based inter-domain model generated from the crowd-sourced inter-domain bottle as described above in FIG. 1. Because the off-device L3 model 624 is server-based, the off-device L3 model 624 is not generated from the on-device sensitive data. In one embodiment, the off-device L3 model 624 generates a set of off-device L3 scores 628, which represents the intra-domain ranking of the off-device search domains 606A-B. Off-device L3 scores 628 are fed to the on-device L3 scores 626. In addition, and in one embodiment, the off-device L3 scores 628 are also fed to the off-device L4 policy 632. By applying the off-device L3 scores 628 with the off-device L4 policy 632, the off-device search 638 generates a final set of scores for the results of the search query 602 for the off-device search domains 606A-B.

As described above, the on-device search 636 receives L2, L3, and L4 scores of the results from the off-device search 638. In one embodiment, the on-device search 636 gathers the L2 scores 620. In this embodiment, the L2 scores 620 represent the relative rankings of search results within the on-device search domains 604A-C and off-device search domains 606A-B. These L2 scores 620 (and search results from both sets of domains 604A-C and 606A-B) are fed to the on-device L3 model 622. The on-device search 636 applies the on-device L3 model 622 to the search results and generates on-device L3 score 626. In one embodiment, the on-device L3 scores 626 are the relative rankings of the on-device search domains 604A-C. In one embodiment, for each results, the L2 score, domain, query features, and personalization input is applied to the L3 model. In this embodiment, the personalization is derived from the on-device sensitive data and is a compressed and/or anonymized version of this data.

In this embodiment, the on-device search 636 receives the off-device L3 scores 626. With these L3 scores 626 and 628, the on-device search 636 applies the on-device L4 policy 632 to the L3 scores 626 (as well as, possibly L2 scores 616A-C and 618A-B and the search results) to determine the final result set 634 for the search query 602. In one embodiment, the on-device search 636 presents the final results at 634 to the user.

Figure 7:
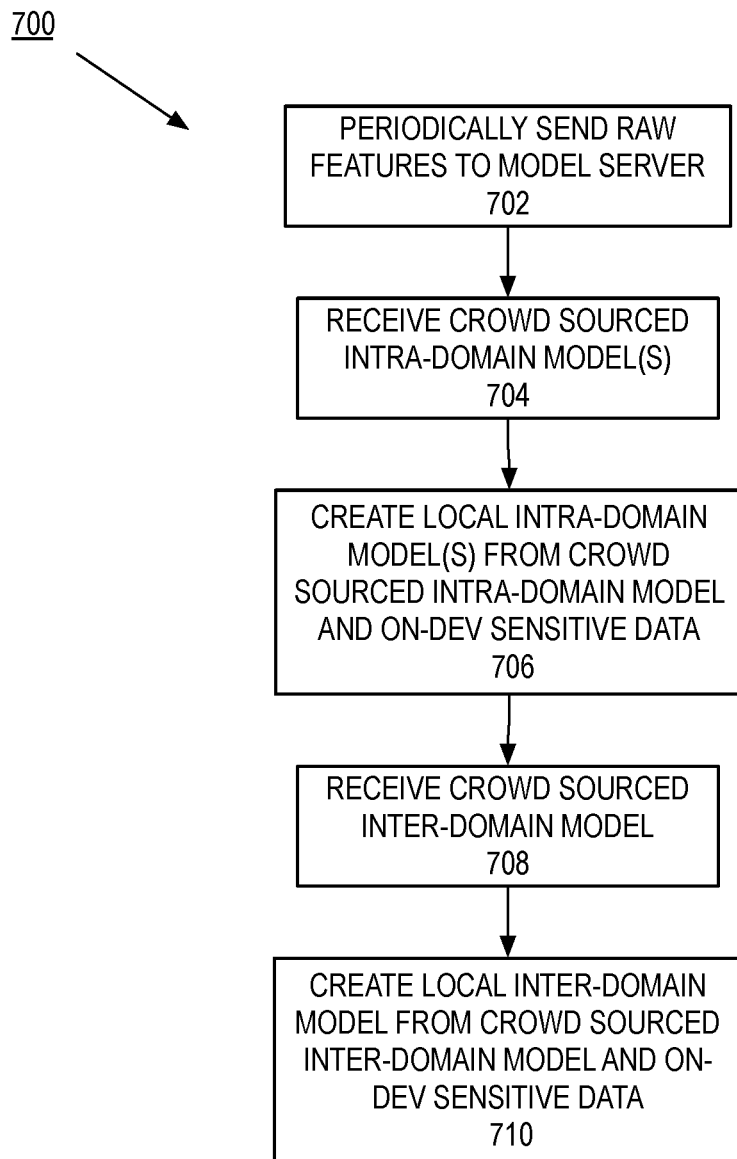
FIG. 7 is flowchart of one embodiment of a process to generate intra- and inter-domain models.

FIG. 7 is flowchart of one embodiment of a process 700 to generate intra- and inter-domain models. In FIG. 7, process 700 begins by periodically sending raw features to the model server at block 702. In one embodiment, the raw features are a set of data that indicates an interaction between the user and the client device that collects the raw features as described above in FIG. 2. At block 704, process 700 receives the crowd-sourced intra-domain model(s). In one embodiment, the crowd-sourced intra-domain model(s) are the machine learning models that are generated by a model server using collected raw features from the client and/or other devices. Process 700 creates the local intra-domain model(s) from the crowd-sourced intra-domain model(s) and on-device sensitive data at block 706. In one embodiment, process 700 creates the local intra-domain model(s) as described in FIG. 5 above. At block 708, process 500 receives the crowd-sourced inter-domain model. In one embodiment, the crowd-sourced inter-domain model is the machine-learning model that is generated by the model server using the collected raw features from the client and/or other devices. Process 700 creates the local inter-domain model from the crowd-sourced inter-domain model and the on-device sensitive data at block 710. In one embodiment, process 700 creates the local inter-domain model as described in FIG. 5 above.

Figure 8:
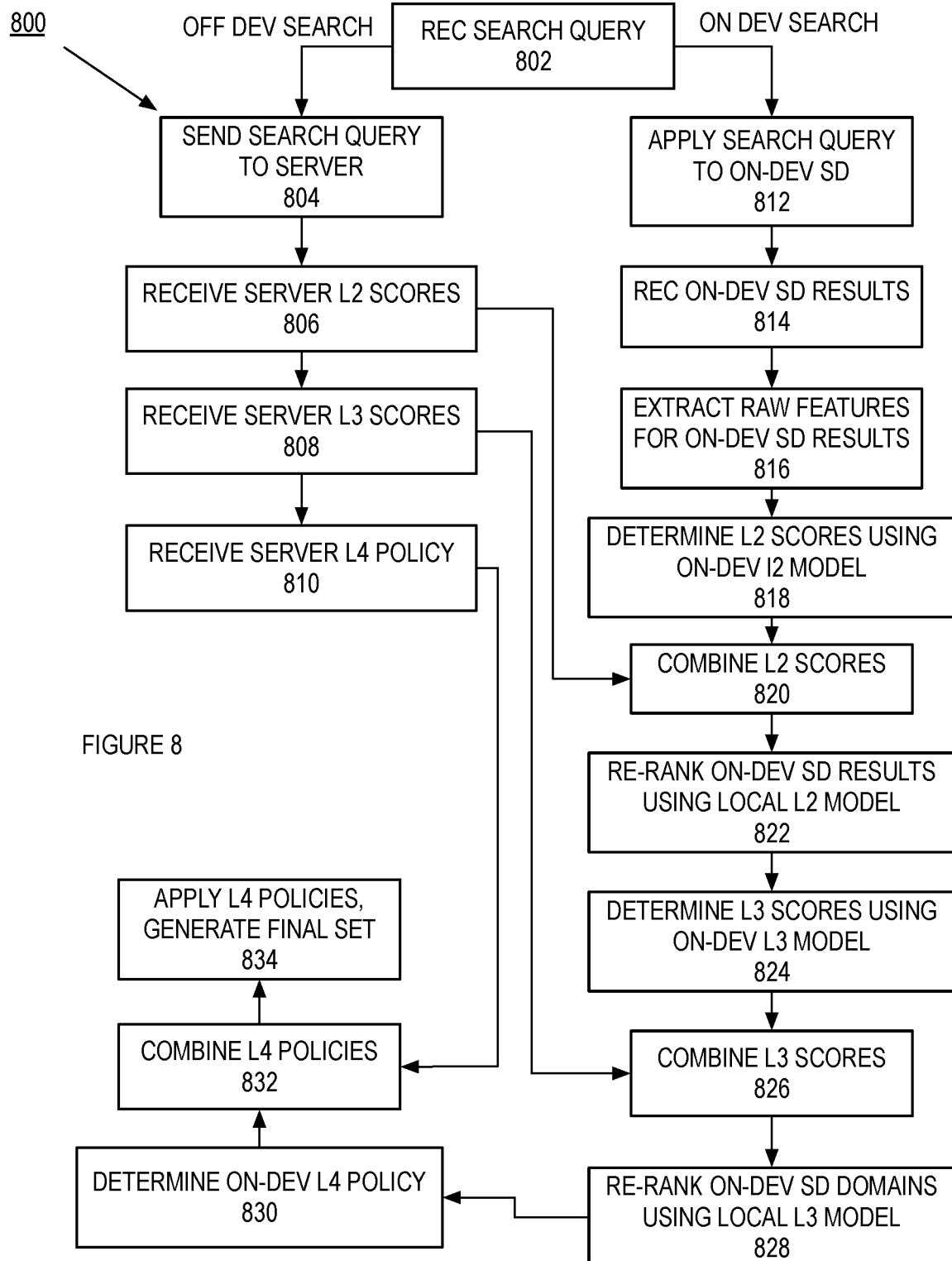
FIG. 8 is flowchart of one embodiment of a process to re-rank search results using intra- and inter-domain models.

FIG. 8 is flowchart of one embodiment of a process 800 to re-rank search results using intra- and inter-domain models. In FIG. 8, process 800 begins by receiving the search query at block 802. In one embodiment, process 800 can perform an on-device search with the search query, off-device search with the search query, and/or both searches using the same search query. If process 800 performs an off-device search, process 800 sends the search query to the server that will perform the off-device search at block 804. At block 806, process 800 receives the server L2 scores for the results of the off-device search using the search query. In one embodiment, the L2 scores for the off-device search results are scores generated using a server-based intra-domain model that was generated from a set of raw features collected from a number of devices. Process 800 forwards the server L2 scores to block 818. Execution proceeds for the off-device search to block 808. At block 808, process 800 receives the server L3 scores. In one embodiment, the L3 scores for the off-device search results or scores generated using a server-based inter-domain model. Process 800 forwards the server L3 scores to block 824. Execution proceeds for the off-device search to block 810. At block 810, process 800 receives the server L4 policy and forwards these policies to block 830.

If process 800 performs an on-device search, at block 812, process 800 applies the search query to the on-device search domains. In one embodiment, process 800 applies to search grade to the on-device search domains as described in FIG. 6 above. Process 800 receives the on-device search domain results at block 814. At block 816, process 800 extracts the raw features for the on-device search domain results. At block 818, process 800 generates the L2 scores for the on-device search domain results. In one embodiment, process 800 generates the L2 scores as described above in FIG. 6. At block 820, process 800 combines the L2 scores from the on-device search and the off-device search. Process 800 re-ranks the on-device search domain results using the local L2 model of block 822. At block 824, process 800 determines the L3 scores using the on-device L3 model. In one embodiment, process 800 determines the L3 score as described above in FIG. 6. Process 800 combines the L3 scores from the on-device search and the off-device search at block 826. At block 828, process 800 re-ranks the on-device search domains using the local L3 model. At block 830, process 800 determines the on-device L4 policy. In one embodiment, process 800 determines the on-device layer for policy as described in FIG. 6 above. Process 800 combines the L4 policies from the on-device and off-device L4 policies at block 832. At block 834, process 800 applies the letter for policies and generates the final set of search results. In one embodiment, process 800 additionally presents the final set of search results to the user.

Figure 9:
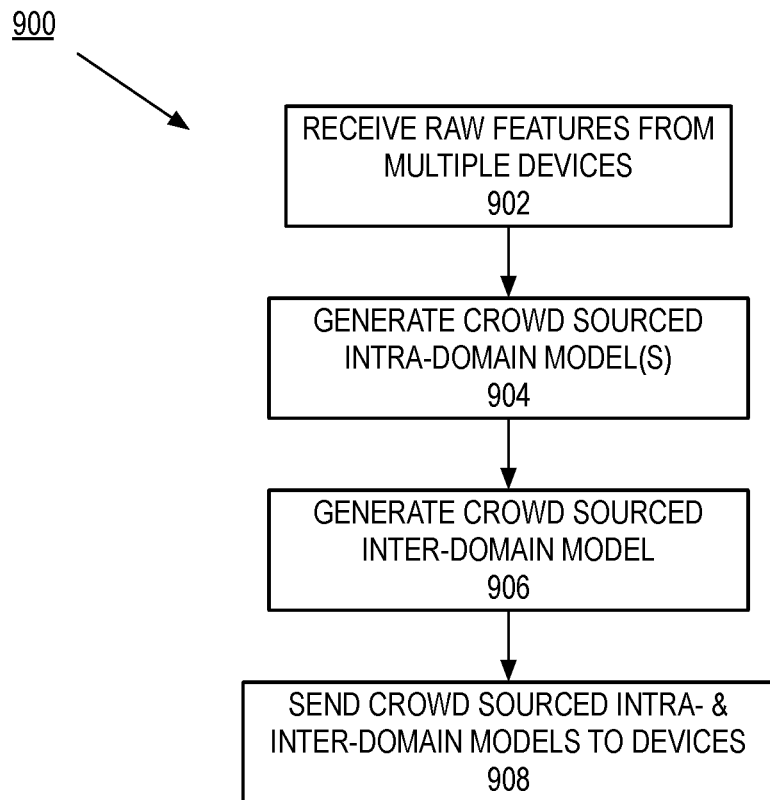
FIG. 9 is flowchart of one embodiment of a process to generate the crowd-sourced intra- and inter-domain models.

FIG. 9 is flowchart of one embodiment of a process 900 to generate the crowd-sourced intra- and inter-domain models. In FIG. 9, process 900 begins by receiving the raw features from multiple devices at block 902. In one embodiment, the raw features received by process 900 are data that indicates, such as the raw features described in FIG. 2 above. At block 904, process 900 generates the crowd-sourced intra-domain model(s). In one embodiment, the crowd-sourced intra-domain model is a model that can be used, in part, to re-rank results within a search domain, such as the crowd-sourced intra-domain model as described in FIG. 1 above. At block 906, process 900 generates the crowd-sourced inter-domain model(s). In one embodiment, the crowd-sourced inter-domain model is a model that can be used, in part, to re-rank search domains, such as the crowd-sourced inter-domain model as described in FIG. 1 above. Process 900 sends the crowd-sourced intra- and inter-domain models to the devices at block 908.

Figure 10:
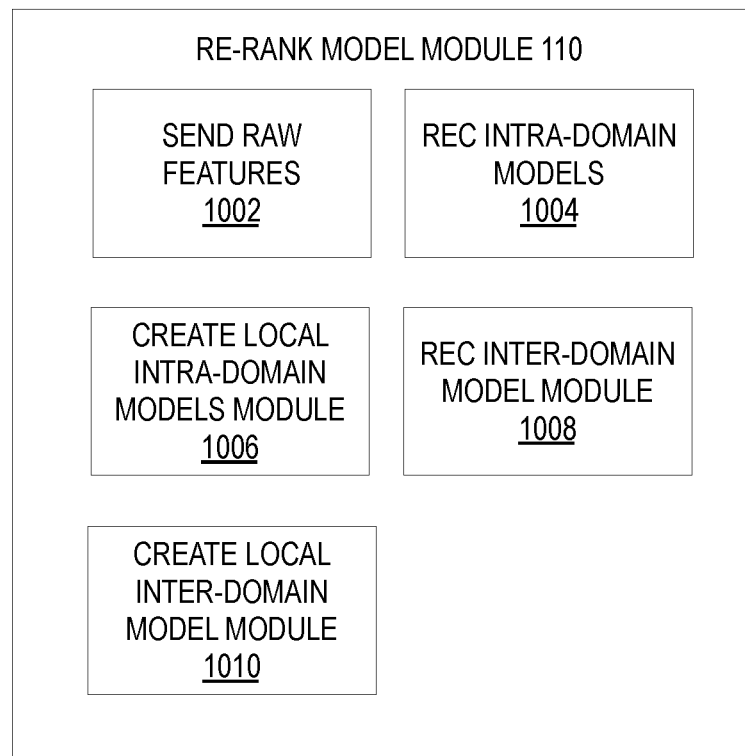
FIG. 10 is a block diagram of one embodiment of a re-rank model module that generates intra- and inter-domain models.

FIG. 10 is a block diagram of one embodiment of a re-rank model module 110 that generates intra- and inter-domain models. In one embodiment, the re-rank model module 110 includes send raw features module 1002, receive intra-domain models 1004, create local intra-domain model module 1006, receive inter-domain model module 1008, and create local inter-domain model module 1010. In one embodiment, the send raw features module 1002 since the raw features from the device as described in FIG. 7, block 702 above. The receive intra-domain models 1004 received the crowd-sourced intra-domain model(s) as described in FIG. 7, block 704 above. The create local intra-domain model module 1006 creates the local intra-domain model as described in FIG. 7, block 706 above. The receive inter-domain model module 1008 receives the inter-domain model as described in FIG. 7, block 708 above. The create local inter-domain model module 1010 creates the local inter-domain model as described in FIG. 7, block 710 above.

Figure 11:
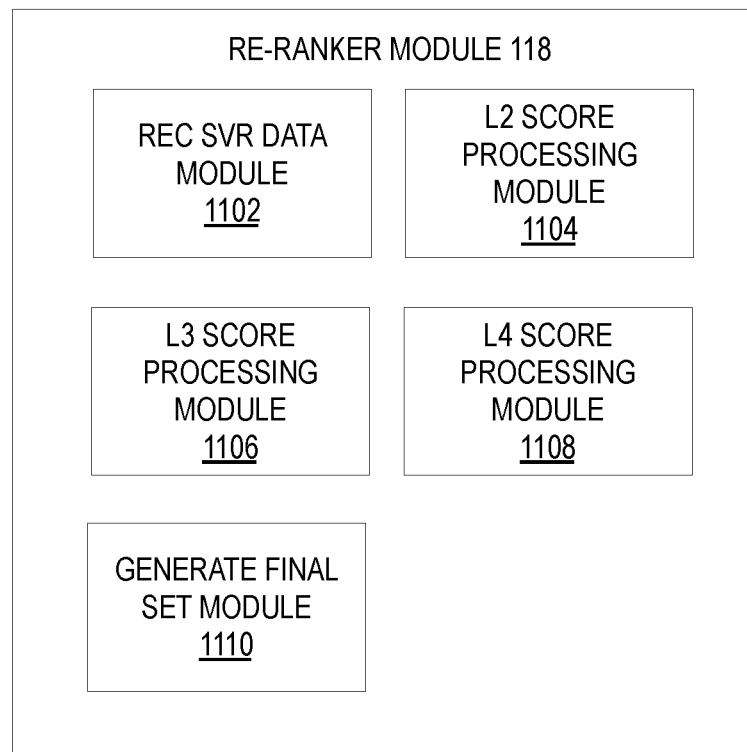
FIG. 11 is a block diagram of one embodiment of re-ranker module that generates re-rank search results using intra- and inter-domain models.

FIG. 11 is a block diagram of one embodiment of re-ranker module 108 that generates re-ranked search results using intra- and inter-domain models. In one embodiment, the re-ranker module 108 includes receive server data module 1102, L2 score processing module 1104, L3 score processing module 1106, L4 score processing module 1108, and generate final set module 1110. In one embodiment, the receive server data module 1102 receives the server search data as described above in FIG. 8, blocks 804, 806, 808 and, 810 above. The L2 score processing module 1104 extracts the raw features and determines the L2 scores as described in FIG. 8, blocks 816, 818, 820, and 822 above. The L3 score processing module 1106 processes the search results using the L3 model as described above in FIG. 8, blocks 824, 826, and 828 above. The L4 score processing module 1108 processes the search results using the L4 policy as described in FIG. 8, blocks 830 and 832 above. The generate final set module 1110 generates the final set of search results using the L4 policies as described in FIG. 8, block 834 above.

Figure 12:
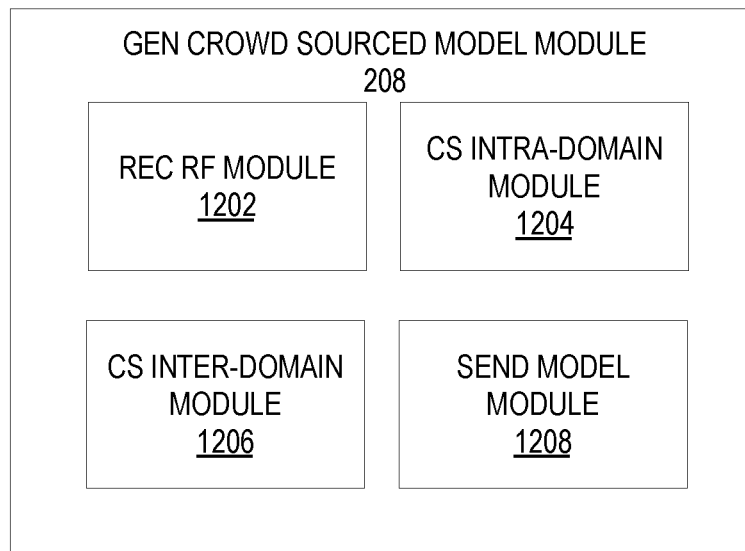
FIG. 12 is a block diagram of one embodiment of generate crowd-sourced model module that generates the crowd-sourced intra- and inter-domain models.

FIG. 12 is a block diagram of one embodiment of generate crowd-sourced model module 208 that generates the crowd-sourced intra- and inter-domain models. In one embodiment, the generate crowd-sourced model module 208 includes receive raw features module 1202, CS intra-domain module 1204, CS inter-domain module 1206, and send model module 1208. In one embodiment, the receive raw features module 1202 receives the raw features as described in FIG. 9, block 902 above. The CS intra-domain module 1204 generates the crowd-sourced intra-domain module as described in FIG. 9, block 904 above. The CS inter-domain module 1206 generates the crowd-sourced inter-domain model as described in FIG. 9, block 906 above. The send model module 1208 sends the crowd-sourced intra- and inter-domain models to the devices as described in FIG. 9, block 908 above.

The present disclosure recognizes that the use of such personal information data, in the present technology, can be used to the benefit of users. For example, the personal information data can be used to re-rank search results that is of greater interest to the user. Accordingly, use of such personal information data enables calculated control of the search results. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Figure 13:
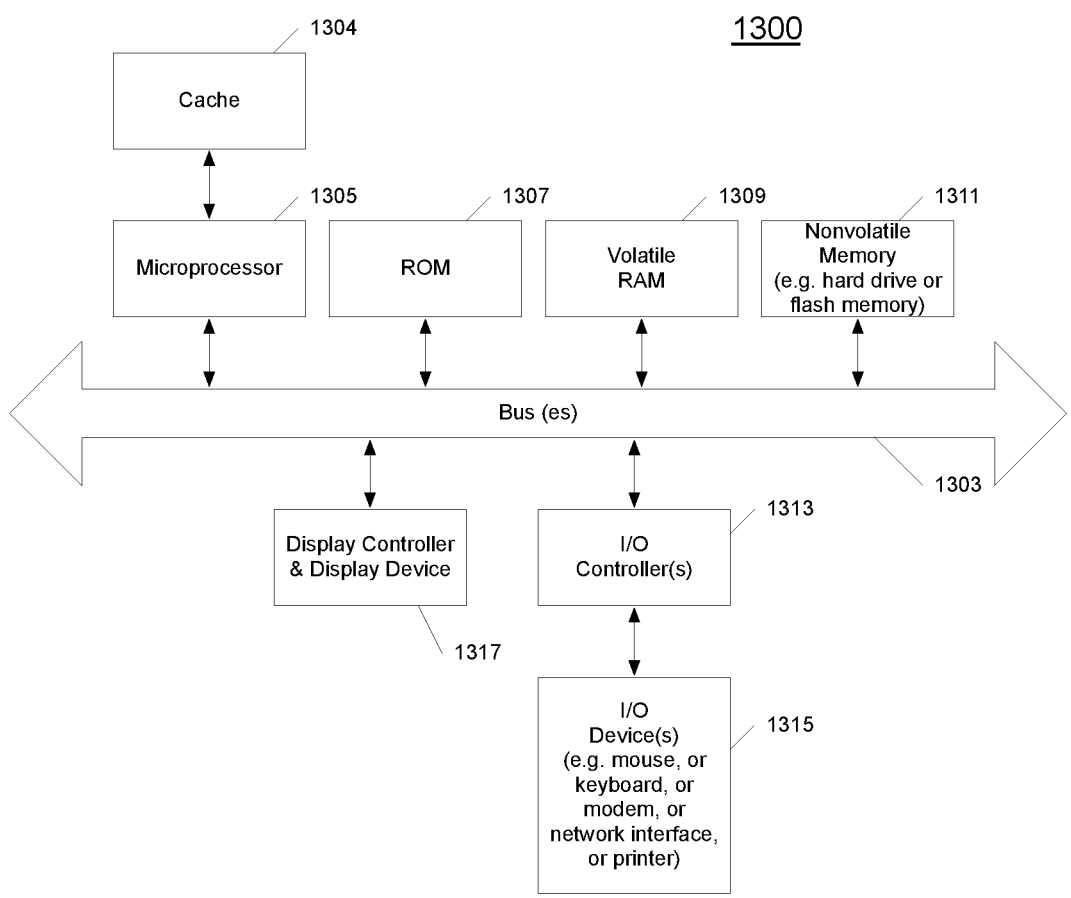
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including a client 102 as shown in FIG. 1. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may include one or more CPU(s), GPU(s), a specialized processor, and/or a combination thereof. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1317 and to peripheral devices such as input/output (I/O) devices which may be mice, keyboards, modems, network interfaces, printers and other devices which are well known in the art. Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Figure 14:
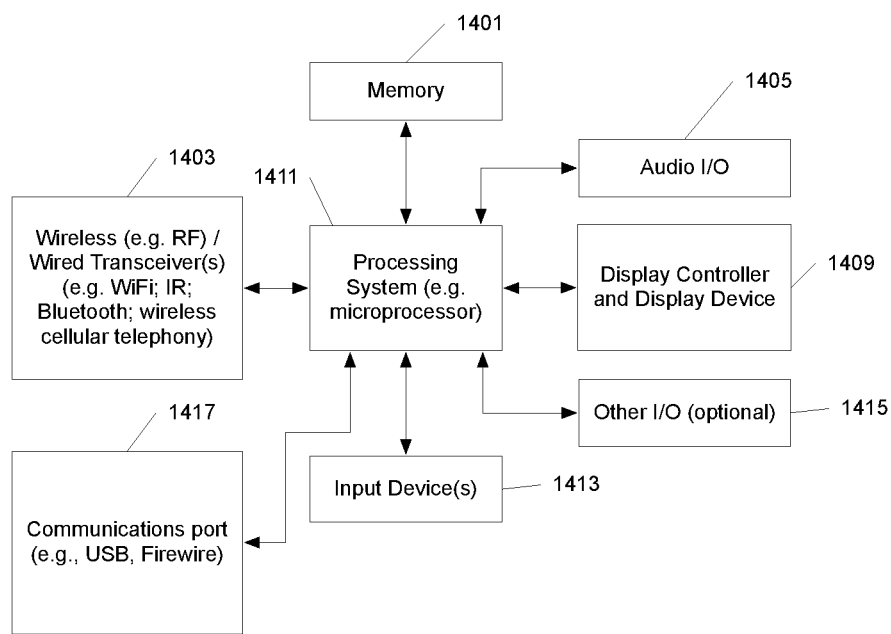
FIG. 14 shows an example of a data processing system, which may be used with one embodiment of the present invention.

FIG. 14 shows an example of another data processing system 1400 which may be used with one embodiment of the present invention. For example, system 1400 may be implemented as a client 102 as shown in FIG. 1. The data processing system 1400 shown in FIG. 14 includes a processing system 1411, which may be one or more microprocessors, or which may be a system on a chip integrated circuit, and the system also includes memory 1401 for storing data and programs for execution by the processing system. The system 1400 also includes an audio input/output subsystem 1405, which may include a microphone and a speaker for, for example, playing back music or providing telephone functionality through the speaker and microphone.

A display controller and display device 1409 provide a visual user interface for the user; this digital interface may include a graphical user interface which is similar to that shown on a Macintosh computer when running OS X operating system software, or Apple iPhone when running the iOS operating system, etc. The system 1400 also includes one or more wireless transceivers 1403 to communicate with another data processing system, such as the system 1400 of FIG. 14. A wireless transceiver may be a WLAN transceiver, an infrared transceiver, a Bluetooth transceiver, and/or a wireless cellular telephony transceiver. It will be appreciated that additional components, not shown, may also be part of the system 1400 in certain embodiments, and in certain embodiments fewer components than shown in FIG. 14 may also be used in a data processing system. The system 1400 further includes one or more communications ports 1417 to communicate with another data processing system, such as the system 1500 of FIG. 15. The communications port may be a USB port, Firewire port, Bluetooth interface, etc.

The data processing system 1400 also includes one or more input devices 1413, which are provided to allow a user to provide input to the system. These input devices may be a keypad or a keyboard or a touch panel or a multi touch panel. The data processing system 1400 also includes an optional input/output device 1415 which may be a connector for a dock. It will be appreciated that one or more buses, not shown, may be used to interconnect the various components as is well known in the art. The data processing system shown in FIG. 14 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1400 may be a network computer or an embedded processing device within another device, or other types of data processing systems, which have fewer components or perhaps more components than that shown in FIG. 14.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "re-ranking," "receiving," "determining," "computing," "sending," "retrieving," "presenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable medium having executable instructions to cause one or more processing units to perform a method to re-rank a plurality of search results, the method comprising:
   receiving, on a client device, a plurality of crowd-source intra-domain ranking models and a crowd-sourced inter-domain ranking model, wherein each of the crowd-sourced ranking models is based on at least on-device interactions of a plurality of users interacting with a plurality of other devices;
   generating, on the client device, a re-ranking model that includes a plurality of intra-domain models and an inter-domain model, wherein the plurality of intra-domain models are generated based on at least the plurality of crowd-sourced intra-domain ranking models and on-device sensitive data that remains on the client device and is not sent to a server, the inter-domain model indicates which of a plurality of search domains are to be ranked higher than others in the plurality of search domains and is generated based on at least the on-device sensitive data and the crowd-sourced inter-domain ranking model, and wherein each of the plurality of search domains corresponds to one of the plurality of intra-domain models;
   receiving, on the client device, a plurality of search results generated over the plurality of search domains, wherein the plurality of search results is ranked according to a first ranking, and the plurality of search results are generated based on at least a search query;
   re-ranking the plurality of search results, by the client device, using the re-ranking model to generate a second ranking of the plurality of search results; and
   presenting the plurality of search results using the second ranking.

2. The machine-readable medium of claim 1, wherein the plurality of search domains includes a plurality of on-device search domains.

3. The machine-readable medium of claim 2, wherein each of the plurality of on-device search domains is selected from the group consisting of text messages, emails, contacts, calendar, contacts, music, movies, photos, application states, and installed applications.

4. The machine-readable medium of claim 1, wherein the intra-domain model is further generated from private information of device user stored on the client device.

5. The machine-readable medium of claim 1, wherein the re-ranking of the plurality of results further comprises:
   re-ranking a domain subset of the plurality of results in one of the plurality of search domains using the corresponding intra-domain model.

6. The machine-readable medium of claim 1, wherein plurality of search domains includes a plurality of off-device search domains.

7. The machine-readable medium of claim 6, wherein each of the plurality of off-device search domains is selected from the group consisting of maps search domain, media store search domain, online encyclopedia search domain, and sites search domain.

8. The machine-readable medium of claim 1, wherein the re-ranking of the plurality of results further comprises: re-ranking the plurality of search domains using the inter-domain model.

9. The machine-readable medium of claim 1, wherein the inter-domain model is further generated from private information of device user stored on the client device.

10. The machine-readable medium of claim 1, wherein the re-ranking model further includes a policy model.

11. A method to re-rank a plurality of search results, the method comprising:
receiving, on a client device, a plurality of crowd-source intra-domain ranking models and a crowd-sourced inter-domain ranking model, wherein each of the crowd-sourced ranking models is based on at least on-device interactions of a plurality of users interacting with a plurality of other devices;
generating, on the client device, a re-ranking model that includes a plurality of intra-domain models and an inter-domain model, wherein the plurality of intra-domain models are generated based on at least the plurality of crowd-sourced intra-domain ranking models and on-device sensitive data that remains on the client device and is not sent to a server, the inter-domain model indicates which of a plurality of search domains are to be ranked higher than others in the plurality of search domains and is generated based on at least the on-device sensitive data and the crowd-sourced inter-domain ranking model, and wherein each of the plurality of search domains corresponds to one of the plurality of intra-domain models;
receiving, on the client device, a plurality of search results generated over the plurality of search domains, wherein the plurality of search results is ranked according to a first ranking, and the plurality of search results are generated based on at least a search query;
re-ranking the plurality of search results, by the client device, using the re-ranking model to generate a second ranking of the plurality of search results; and
presenting the plurality of search results using the second ranking.

12. The method of claim 11, wherein the plurality of search domains includes a plurality of on-device search domains.

13. The method of claim 12, wherein each of the plurality of on-device search domains is selected from the group consisting of text messages, emails, contacts, calendar, contacts, music, movies, photos, application states, and installed applications.

14. The method of claim 11, wherein the intra-domain model is further generated from private information of device user stored on the client device.

15. The method of claim 11, wherein the re-ranking of the plurality of results further comprises:
re-ranking a domain subset of the plurality of results in one of the plurality of search domains using the corresponding intra-domain model.

16. The method of claim 11, wherein the plurality of search domains includes a plurality of off-device search domains.

17. The method of claim 16, wherein each of the plurality of off-device search domains is selected from the group consisting of maps search domain, media store search domain, online encyclopedia search domain, and sites search domain.

18. A device to re-rank a plurality of search results, the device comprising:
a processor;
a memory coupled to the processor though a bus; and
a process executed from the memory by the processor causes the processor to
receive a plurality of crowd-source intra-domain ranking models and a crowd-sourced inter-domain ranking model, wherein each of the crowd-sourced ranking models is based on at least on-device interactions of a plurality of users interacting with a plurality of other devices;
generate a re-ranking model that includes a plurality of intra-domain models and an inter-domain model, wherein the plurality of intra-domain models are generated based on at least the plurality of crowd-sourced intra-domain ranking models and on-device sensitive data that remains on the device and is not sent to a server, the inter-domain model indicates which of a plurality of search domains are to be ranked higher than others in the plurality of search domains and is generated based on at least the on-device sensitive data and the crowd-sourced inter-domain ranking model, and wherein each of the plurality of search domains corresponds to one of the plurality of intra-domain models,
receive a plurality of search results generated over the plurality of search domains, wherein the plurality of search results is ranked according to a first ranking, and the plurality of search results are generated based on at least a search query,
re-rank the plurality of search results using the re-ranking model to generate a second ranking of the plurality of search results, and
present the plurality of search results using the second ranking.

* * * * *